Patented July 10, 1934

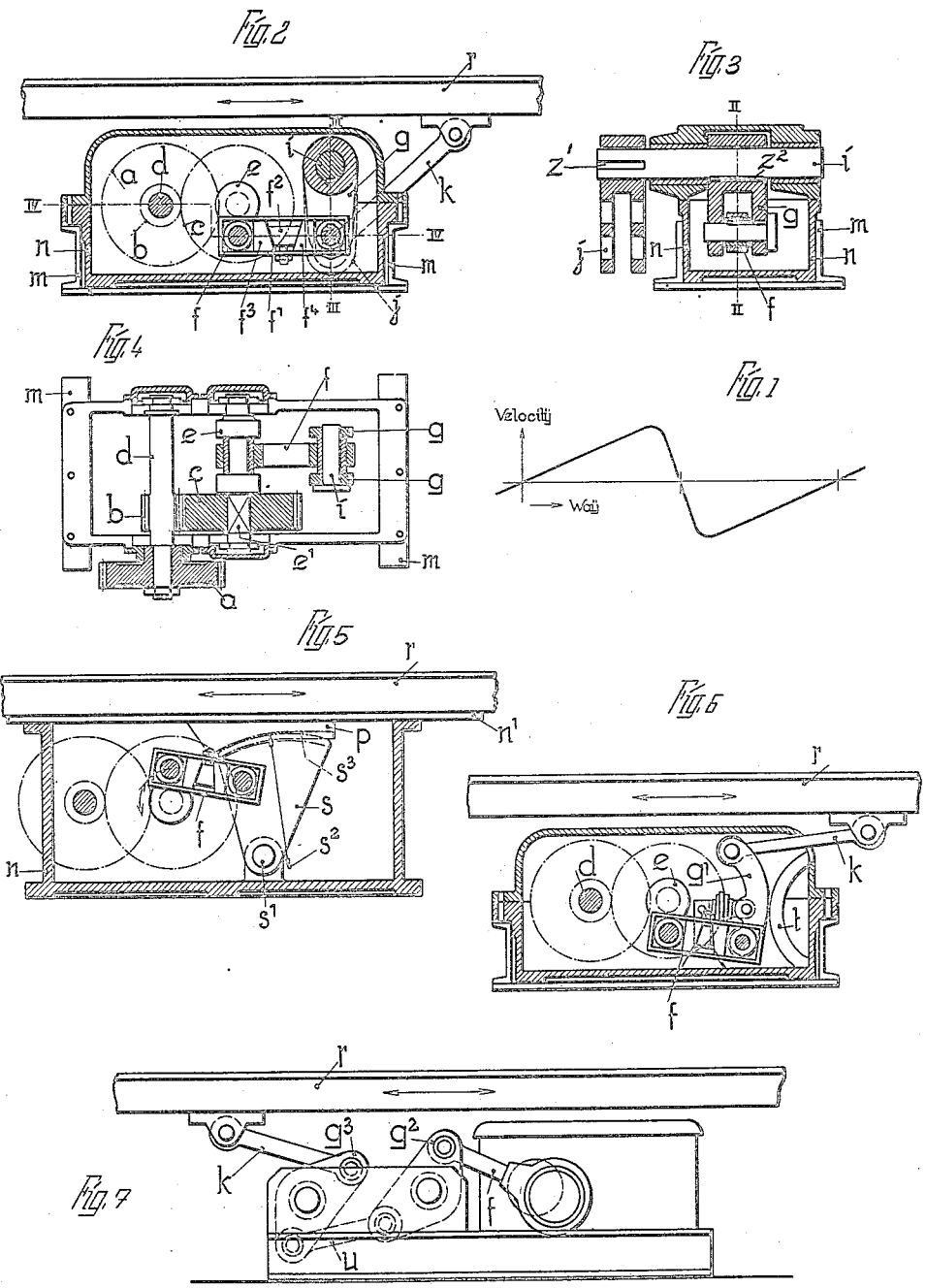

1,966,319

UNITED STATES PATENT OFFICE 1,966,319

DRIVING GEAR OF RECIPROCATING MECHANISM SUCH AS JIGGERS, SHAKING CONVEYERS, AND THE LIKE

Karl Stroedter, Bochum, Germany, assignor to the firm Gebr. Eickhoff Maschinenfabrik und Eisengiesserei, Bochum, Germany Application September 9, 1926, Serial No. 134,382
In Great Britain July 8, 1926

4 Claims. (Cl. 74—26)

For the purpose of attaining the most favourable degree of efficiency in the action of jiggers and like mechanism the speed progress of the machine during its forward and backward motion should correspond approximately to the speed diagram illustrated in Fig. 1, that is to say, the jigger should receive a uniform or approximately uniform acceleration during its operating and its return stroke and sudden material retardation shortly prior to the completion of its operative stroke.

In order to enable this sequence of movement which is readily obtainable where the drive is derived from a reciprocating motor, to be as nearly as possible realized when driven by a rotary engine the jigger is driven by a gear comprising a crank, a connecting rod and a rocker. In the use of a gear of this kind, however, if the connecting rod were relatively long the developed movement of the jigger would approach the form of a sinus curve and accordingly would be very unfavourable. Now this form of movement is in some cases improved by the use of a short connecting rod, that is to say, a connecting rod the length of which is small in relation to the radius of its crank, by the use of which per se, however, a perfect or nearly ideal form of movement cannot be obtained. In order to achieve by means of this idea a form of movement approaching the ideal curve as nearly as possible the short connecting rod according to this invention is brought into co-operative connection with an element which by itself exhibits the property to bring the sinus form of a crank gear as closely as possible to the ideal form of movement so that therefore the effect of the short connecting rod and that of the said element are added in the desired sense. This element may for instance be a rocker the length and angular position of which in relation to the connecting rod are so calculated as to cause the movement of the jigger to be favourably influenced. Or use may be made for example of a toothed segment the axis of rotation of which is eccentrical to the centre of its toothed arc. Or the said element can be represented by a rolling lever or the like and a further approach to the ideal form of movement is then attainable by a duplication or manifold arrangement of these elements.

The accompanying drawing illustrated in Fig. 1, is a speed diagram; Figs. 2 to 4 one constructional example of the gear i. e. in Fig. 2 a vertical section on the line II—II of Fig. 3, in Fig. 3 in a vertical section on the line III—III of Fig. 2 and in Fig. 4 in a horizontal section on line IV—IV of Fig. 2.

Fig. 5 represents a second constructional form of the gear,

Fig. 6 a third and

Fig. 7 a fourth construction, each in vertical view.

In the arrangement shown in Figs. 2 to 4 the driving motor, for example, an electric motor or a compressed air or other engine not shown, drives a preliminary gear train $a$, $b$ and $c$ of which the pinion $b$ is preferably made in one with its shaft $d$. The gear wheel $c$ is carried by a prismatic stub shaft $e'$ of the crank $e$ which transmits its rotary movement to an element $g$, (in this instance a one-armed rocker) by means of a connecting rod $f$. In the instance shown this connecting rod $f$ is constituted by a frame $f'$ containing the crank and rocker pin bearings $f^3$, $f^4$ which are adjustable by means of a wedge $f^2$ or the like as best seen in Fig. 2. The length of this connecting rod $f$ in relation to the radius of the crank $e$ is relatively small, that is to say, the ratio of the crank radius to the length of the connecting rod should be smaller or at any rate not larger than 1 to 3.5. Moreover for the attainment of a favourable form of movement the length of the lever arm of the rocker $g$ as well as its angular position in regard to the connecting rod $f$ should be such relatively to the connecting rod (as can be readily ascertained graphically) as to cause the form of movement resulting from the short connecting rod to approach as nearly as possible the form of movement represented by Fig. 1. The rocker $g$ in the example referred to transmits its movement through a shaft $i$ to a rocker element $j$ arranged outside the casing $n$. The rocker $j$ drives the jigger table or conveyer $r$ by means of a pitman $k$. By appropriately varying the angular positions of the rockers $g$ and $j$ to one another and also in relation to the crank $f$ the form of movement of the jigger may be controlled from case to case and moreover by an appropriately larger adjustment of one of the rockers, preferably rocker $j$, the conveying sense may be reversed enabling therefore the driving gear without any change to be employed for the operation of jigger mechanism located in the same direction but operating in the reverse sense. The rockers $g$ and $j$ may be secured to the shaft $i$ in any suitable manner that will permit the aforesaid angular adjustment of the rockers with respect to one another and with respect to the crank $f$.

In the present instance the shaft $i$ and the rockers $g$ and $j$ are shown as provided with a suitable arrangement of key ways $z^1$ for receiving the keys $z^2$. The short connecting rod interposed in the gear enables as shown by the drawing in the case of a housed gear a very compact arrangement of the gear parts and the space for their accommodation to be attained and also lessened by the possibility of fitting the casing $n$ or its base portion as indicated in a foundation frame $m$. This compact construction is moreover aided by the shaft $d$ and the pinion $b$ being made in one piece. By preference this shaft as well as the crank shaft $e$ are journaled in ball bearings.

The form of movement attained by the use of the short connecting rod in the manner described may also be obtained by the construction for example of the rocker in the form of a toothed segment of which the axis of rotation is arranged eccentrically to the centre of the toothed arc as shown in Fig. 5. In this case the short connecting rod $f$ driven as before from a rotary motor by an intermediate gear train of any kind is operatively connected to a toothed segment $s$, the axis of rotation $s'$ of which is as shown eccentrically to the centre $s^2$ of the toothed arc $s^3$. This segment $s$ transmits its oscillations to a toothed rack $p$ adapted to drive directly or by means of a connecting rod or a rocker, or also as shown the cover $n'$ of the casing $n$ and by means of this cover the jigger table $r$.

In order to attain the desired form of movement the rocker may moreover as shown in Fig. 6, have the form of a rolling lever which as shown in this figure is marked $g'$, the letter $t$ indicating its curved guide, $f$ the short connecting rod and $e$ its crank.

Another mode of improving the form of movement of the jigger resulting from the use of the short connecting rod is indicated in Figure 7, where the rocker is duplicated or more than two of such rockers may be arranged in series. In this arrangement the short connecting rod $f$ is connected to a double-armed rocker $g^2$ and the latter is in turn connected by a short pitman $u$ to a double armed rocker $g^3$ which transmits its movement to the jigger $r$ by means of a pitman $k$. The lengths of the lever arms of the two rockers $g^2$, $g^3$ are different.

In those cases in which the connecting point of the gear to the jigger mechanism is very close to the gear itself, the form of movement of the jigger may therefore be favourably influenced by an appropriate shortening of the pitman $k$.

I claim:

1. The combination with a vibrating support for handling material, of opposed supports, a crank shaft journalled on said supports, a second shaft journalled on said supports, a rocker arm therefor, the rocker arm of said second shaft being considerably longer than the crank arm of the first shaft, a rod connecting the crank arm to the end of the rocker arm, a second rocker arm on the second shaft, a pitman connected to the vibrating material support at one end and to the second rocker arm, and a power shaft geared to the first shaft whereby the velocity cycle shown in Fig. 1 will be generated in the motion of the vibrating support.

2. The combination with a vibrating support for handling material, of a casing, opposed supports in said casing, a crank shaft journalled on said supports, a second shaft journalled on said supports, a rocker arm on said second shaft within the casing, the rocker arm of said second shaft being considerably longer than the crank arm of the first shaft, a rod connecting the crank arm to the end of the rocker arm, a second rocker arm on the second shaft outside the casing, a pitman connected to the vibrating material support at one end and to said second rocker arm, and a power shaft geared to the first shaft whereby the velocity cycle shown in Fig. 1 will be generated in the motion of the vibrating support.

3. The combination with a vibrating support for handling material, of a substantially closed casing, opposed supports within said casing, a crank shaft journalled on said supports, a second shaft parallel to said crank shaft journalled on said supports, a rocker arm mounted on said second shaft, the rocker arm of said second shaft being considerably longer than the crank arm of the first shaft, a rod connecting the crank arm to the end of the rocker arm, said second shaft extending outside the casing, a second rocker arm on said second shaft outside the casing, a pitman connected to the vibrating material support at one end and to said second rocker arm, and a power shaft geared to the first shaft whereby the velocity cycle shown in Fig. 1 will be generated in the motion of the vibrating support.

4. The combination with a vibrating support for handling material, of a substantially closed casing, opposed supports within said casing carried by the walls thereof, a horizontal crank shaft journalled on said supports, a second shaft parallel to said crank shaft journalled on said supports, a rocker arm mounted on said second shaft, the rocker arm of said second shaft being considerably longer than the crank arm of the first shaft, a rod connecting the crank arm to the end of the rocker arm, said second shaft extending outside the casing through one side wall thereof, a second rocker arm on said second shaft outside the casing, a pitman connected to the vibrating material support at one end and to said second rocker arm, and a power shaft geared to the first shaft whereby the velocity cycle shown in Fig. 1 will be generated in the motion of the vibrating support.

KARL STROEDTER.